United States Patent
Huang et al.

(10) Patent No.: US 8,523,362 B2
(45) Date of Patent: Sep. 3, 2013

(54) ILLUMINATION SYSTEM AND PROJECTION APPARATUS

(75) Inventors: Chien-Jung Huang, Hsin-Chu (TW); Pei-Ching Liu, Hsin-Chu (TW); Ruei-Bin Jhang, Hsin-Chu (TW); S-Wei Chen, Hsin-Chu (TW)

(73) Assignee: Young Optics Inc., Hsin-Chu (TW)

( * ) Notice: Subject to any disclaimer, the term of this patent is extended or adjusted under 35 U.S.C. 154(b) by 221 days.

(21) Appl. No.: 12/860,044

(22) Filed: Aug. 20, 2010

(65) Prior Publication Data
US 2011/0096298 A1 Apr. 28, 2011

(30) Foreign Application Priority Data

Oct. 28, 2009 (TW) ................................ 98136412 A (51) Int. Cl.
*G03B 21/00* (2006.01)
(52) U.S. Cl.
USPC ................... 353/31; 353/20; 353/30; 353/38; 353/94; 353/99; 349/8; 362/227; 362/231
(58) Field of Classification Search
USPC ................. 353/31, 20, 30, 33, 34, 37, 38, 99, 353/102, 94, 122; 362/227, 231, 235, 800, 362/583; 349/5, 7–10, 4
See application file for complete search history.

(56) References Cited

U.S. PATENT DOCUMENTS

| | | | |
|---|---|---|---|
| 6,330,112 B1 * | 12/2001 | Kaise et al. | 359/621 |
| 6,869,189 B2 * | 3/2005 | Kim et al. | 353/84 |
| 6,910,777 B2 | 6/2005 | Ito | |
| 6,987,546 B2 | 1/2006 | Ouchi et al. | |
| 7,201,498 B2 | 4/2007 | Shimaoka et al. | |
| 7,234,820 B2 * | 6/2007 | Harbers et al. | 353/94 |
| 7,237,909 B2 * | 7/2007 | Yokote et al. | 353/94 |
| 7,300,177 B2 | 11/2007 | Conner | |

(Continued)

FOREIGN PATENT DOCUMENTS

| | | |
|---|---|---|
| CN | 1467533 | 1/2004 |
| CN | 101052915 A | 10/2007 |
| CN | 101749557 | 6/2010 |
| TW | I236568 | 7/2005 |

OTHER PUBLICATIONS

Taiwan Office Action for corresponding Taiwan Application dated Jan. 24, 2013 with English translation.

*Primary Examiner* — Georgia Y Epps
*Assistant Examiner* — Sultan Chowdhury
(74) *Attorney, Agent, or Firm* — Muncy, Geissler, Olds & Lowe, PLLC (57) ABSTRACT

An illumination system includes a chip package, a first dichroic film, a second dichroic film, and a third dichroic film. The first dichroic film, the second dichroic film, and the third dichroic film are not parallel to each other and do not cross each other. The chip package includes a first light-emitting chip capable of emitting a first light beam, a second light-emitting chip capable of emitting a second light beam, and a third light-emitting chip capable of emitting a third light beam. The first light-emitting chip, the second light-emitting chip, and the third light-emitting chip are arranged in a row. The first dichroic film reflects the first light beam and transmitting the second light beam, the second dichroic film reflects the second light beam, the first dichroic film and the second dichroic film transmit the third light beam, and the third dichroic film reflects the third light beam.

15 Claims, 7 Drawing Sheets

(56) References Cited

U.S. PATENT DOCUMENTS

| | | | |
|---|---|---|---|
| 7,390,097 B2* | 6/2008 | Magarill | 353/94 |
| 7,553,024 B2* | 6/2009 | Ouchi et al. | 353/20 |
| 2005/0219478 A1* | 10/2005 | Yoshii et al. | 353/99 |
| 2006/0164600 A1* | 7/2006 | Morejon et al. | 353/31 |
| 2006/0274278 A1* | 12/2006 | Lee et al. | 353/53 |
| 2007/0139620 A1* | 6/2007 | Bruzzone | 353/20 |
| 2007/0297061 A1* | 12/2007 | Kyomoto et al. | 359/618 |
| 2008/0252854 A1* | 10/2008 | Liao et al. | 353/31 |
| 2009/0103053 A1* | 4/2009 | Ichikawa et al. | 353/33 |
| 2010/0045938 A1* | 2/2010 | Lin et al. | 353/33 |
| 2011/0170313 A1* | 7/2011 | Sommer et al. | 362/583 |

\* cited by examiner

ILLUMINATION SYSTEM AND PROJECTION APPARATUS

BACKGROUND OF THE INVENTION a. Field of the Invention

The invention relates to an illumination system and a projection apparatus having the illumination system.

b. Description of the Related Art

Currently, in a projection apparatus an ultra high pressure lamp capable of emitting white light may cooperate with a color wheel to produce red light, green light, and blue light in succession and to display color images as a result. Further, in the recent trend, red light emitting diodes, green light emitting diodes, and blue light emitting diodes are used as a light source for a projection apparatus.

Figure 6:
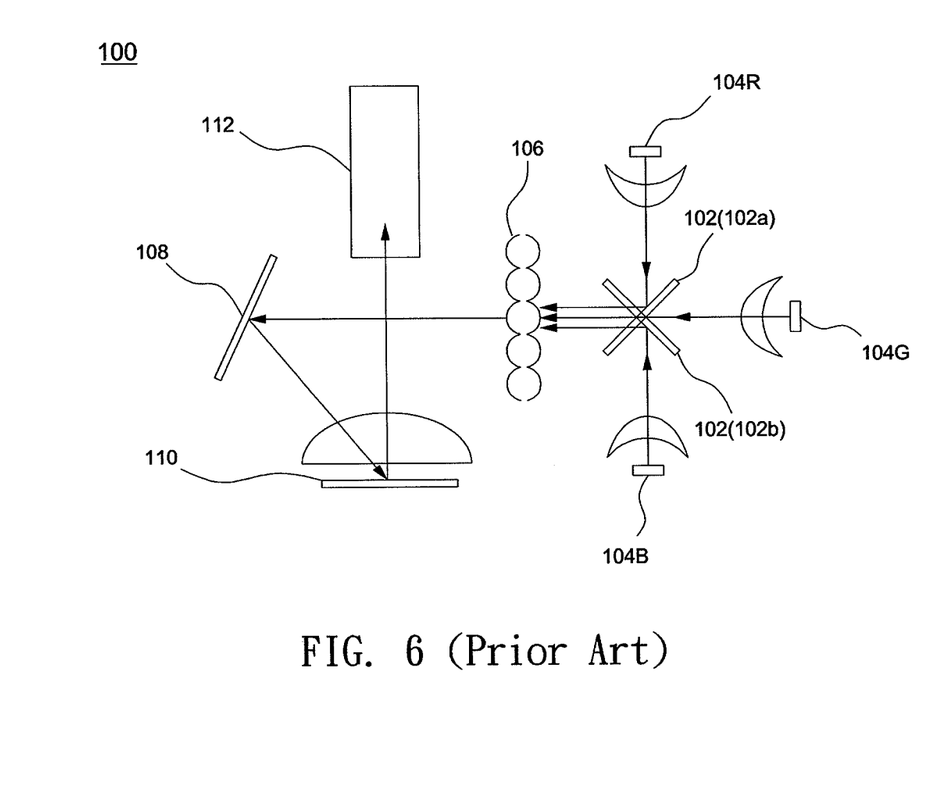
FIG. 6 shows a schematic diagram illustrating a conventional projection apparatus.

Referring to FIG. 6, in a projection apparatus 100 where a red light emitting diode, a blue light emitting diode, and a green light emitting diode are used as a light source, an X-mirror 102 is commonly used to combine different color beams. The X-mirror 102 includes, for instance, a red dichroic mirror 102a and a blue dichroic mirror 102b cross to each other. A red light beam emitted from a red LED 104R is reflected by the red dichroic mirror 102a, a blue light beam emitted from a blue LED 104B is reflected by the blue dichroic mirror 102b, and a green light beam emitted from a green LED 104G passes through the red dichroic mirror 102a and the blue dichroic mirror 102b. Hence, the X-mirror is allowed to guide the red light beam, the green light beam, and the blue light beam coming from different directions to propagate in an identical direction, and then these light beams are homogenized by a fly-eye lens 106. Thereafter, the red light beam, the green light beam, and the blue light beam are reflected by a reflective mirror 108 and modulated by a digital micromirror device 110 to form a colored image beam. Finally, the colored image beam enters a projection lens 112. However, in the X-mirror 102, an adhesive region (i.e. overlapped region) between the red dichroic mirror 102a and the blue dichroic mirror 102b fails to deflect the red light beam, the green light beam, and the blue light beam to result in the loss of light. Besides, an area of the adhesive region compared with a cross-sectional area of a light beam emitted from a light-emitting diode becomes larger when the light-emitting diode instead of an ultra high pressure lamp is used. This may result in higher loss of light. Further, since the red light beam, the green light beam, and the blue light beam are incident to the X-mirror 102 from three different directions, the space-efficiency of components in a projection apparatus is poor and results in a bulky projection apparatus.

Figure 7:
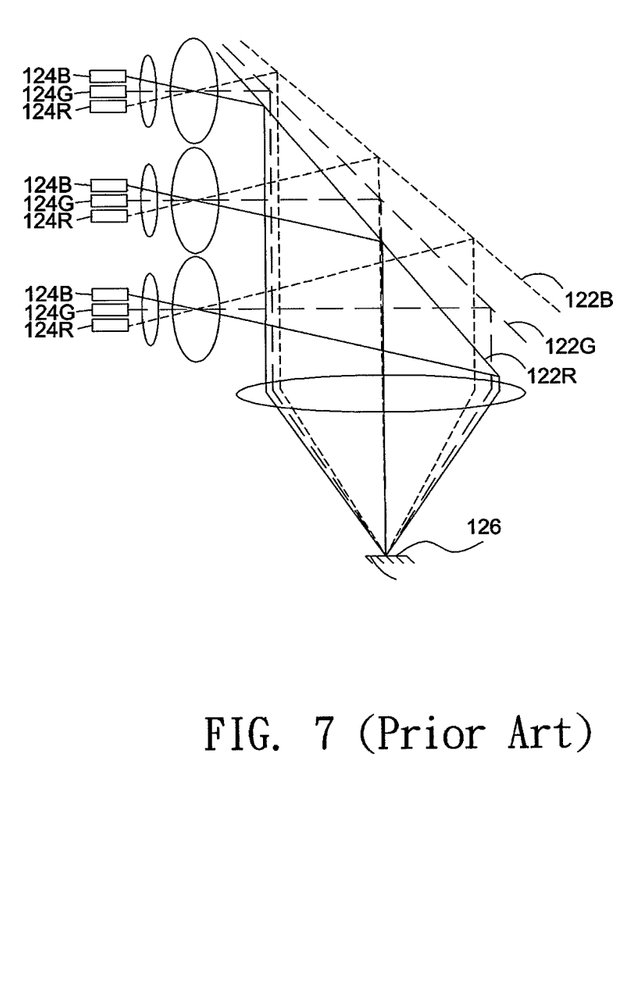
FIG. 7 shows a schematic diagram illustrating a conventional light-mixing system.

Further, as shown in FIG. 7, U.S. Pat. No. 7,201,498 discloses a light-mixing system where light beams emitted from LEDs 124B, 124G, and 124R are reflected by three dichroic mirrors that are not parallel to each other and then are guided into an objective 126. However, such design merely provides the function of combining different color beams but fails to disclose how to improve light-utilization efficiency and reduce occupied space of a projection apparatus. Similarly, the design of three dichroic mirrors not parallel to each other is also disclosed in U.S. Pat. No. 6,910,777 and U.S. Pat. No. 6,987,546. However, these designs similarly do not disclose how to improve light-utilization efficiency and space-utilization efficiency.

BRIEF SUMMARY OF THE INVENTION

The invention provides an illumination system with good light-utilization efficiency and space-utilization efficiency, and a projection apparatus including the illumination system.

Other advantages and objects of the invention may be further comprehended through the technical features disclosed in the invention.

In order to achieve one or part of or all the objectives or other objectives, in an embodiment of the invention, an illumination system is provided. The illumination system includes a chip package, a first dichroic film, a second dichroic film, and a third dichroic film. The chip package includes a first light-emitting chip capable of emitting a first light beam, a second light-emitting chip capable of emitting a second light beam, and a third light-emitting chip capable of emitting a third light beam. The first light-emitting chip, the second light-emitting chip, and the third light-emitting chip are arranged in a row, and the first light beam, the second light beam, and the third light beam have mutually different colors. The first dichroic film is disposed in the light paths of the first light beam, the second light beam, and the third light beam. The second dichroic film is disposed in the light paths of the second light beam and the third light beam. The third dichroic film is disposed in the light path of the third light beam. The first dichroic film, the second dichroic film, and the third dichroic film are not parallel to each other and do not cross each other. The first dichroic film, the second dichroic film, and the third dichroic film are numbered for the proximity to the chip package, and the first dichroic film is capable of reflecting the first light beam and transmitting the second light beam, the second dichroic film is capable of reflecting the second light beam, the first dichroic film and the second dichroic film are capable of transmitting the third light beam, and the third dichroic film is capable of reflecting the third light beam. The first light beam, the second light beam, and the third light beam form an illumination light beam as the first light beam, the second light beam, and the third light beam respectively leaving the first dichroic film, the second dichroic film, and the third dichroic film.

In one embodiment, the illumination system further includes a light-homogenizing element disposed in the light path of the illumination light beam and the chip package further includes a lens covering the first light-emitting chip, the second light-emitting chip, and the third light-emitting chip.

In one embodiment, the second light-emitting chip is disposed between the first light-emitting chip and the third light-emitting chip, and the sizes of the first light-emitting chip and the third light-emitting chip are both smaller than the size of the second light-emitting chip.

In another embodiment of the invention, a projection apparatus is provided. The projection apparatus includes an illumination system, a light valve, and a projection lens. The illumination system includes a chip package, a first dichroic film, a second dichroic film, and a third dichroic film. The chip package includes a first light-emitting chip capable of emitting a first light beam, a second light-emitting chip capable of emitting a second light beam, and a third light-emitting chip capable of emitting a third light beam. The first light-emitting chip, the second light-emitting chip, and the third light-emitting chip are arranged in a row, and the first light beam, the second light beam, and the third light beam have mutually different colors. The first dichroic film is disposed in the light paths of the first light beam, the second light beam, and the third light beam. The second dichroic film is disposed in the light paths of the second light beam and the third light beam. The third dichroic film is disposed in the light path of the third light beam. The first dichroic film, the second dichroic film, and the third dichroic film are not parallel to each other and do not cross each other. The first dichroic film, the second dichroic film, and the third dichroic film are numbered for the proximity to the chip package, and the first dichroic film is capable of reflecting the first light beam and transmitting the second light beam, the second dichroic film is capable of reflecting the second light beam, the first dichroic film and the second dichroic film are capable of transmitting the third light beam, and the third dichroic film is capable of reflecting the third light beam. The first light beam, the second light beam, and the third light beam form an illumination light beam as the first light beam, the second light beam, and the third light beam respectively leaving the first dichroic film, the second dichroic film, and the third dichroic film. The light valve is disposed in the light path of the illumination light beam for transforming the illumination light beam into an image beam. The projection lens is disposed in the light path of the image beam.

In one embodiment, the projection apparatus further includes a total-internal-reflection prism disposed in the light paths of the illumination light beam and the image beam and between the light valve and the projection lens.

In one embodiment, the projection apparatus further includes a reflective mirror disposed in the light path of the illumination light beam and between the illumination system and the light valve.

In one embodiment, the projection apparatus further includes a light-homogenizing element disposed in the light path of the illumination light beam and between the first dichroic film and the light valve, the light-homogenizing element is a fly-eye lens that has a plurality of lens elements arranged in an array, and each of the lens elements has a shape complementary to the shape of a light spot deformed as a result of oblique incidence.

In one embodiment, the illumination system further includes a condenser lens disposed in the light path of the illumination light beam and between the light-homogenizing element and the light valve, and a central axis of the condenser lens is away from an optical axis of the projection apparatus.

In another embodiment of the invention, a projection apparatus is provided. The projection apparatus includes an illumination system, a light valve, a light-homogenizing element, and a projection lens. The illumination system includes a chip package, a first dichroic film, a second dichroic film, and a third dichroic film. The chip package includes a first light-emitting chip capable of emitting a first light beam, a second light-emitting chip capable of emitting a second light beam, and a third light-emitting chip capable of emitting a third light beam. The first light-emitting chip, the second light-emitting chip, and the third light-emitting chip are arranged in a row. The second light-emitting chip is disposed between the first light-emitting chip and the third light-emitting chip, and the sizes of the first light-emitting chip and the third light-emitting chip are both smaller than the size of the second light-emitting chip. The first light beam, the second light beam, and the third light beam have mutually different colors. The first dichroic film is capable of deflecting the first light beam, the second dichroic film is capable of deflecting the second light beam, and the third dichroic film is capable of deflecting the third light beam. The first dichroic film, the second dichroic film, and the third dichroic film are not parallel to each other and do not cross each other. The first light beam, the second light beam, and the third light beam form an illumination light beam as the first light beam, the second light beam, and the third light beam respectively leaving the first dichroic film, the second dichroic film, and the third dichroic film. The light valve is disposed in the light path of the illumination light beam for transforming the illumination light beam into an image beam. The light-homogenizing element is disposed in the light path of the illumination light beam and between the first dichroic film, the second dichroic film, the third dichroic film, and the light valve. The projection lens is disposed in the light path of the image beam.

The embodiments of the invention have at least one of the following advantages. First, since the first dichroic film, the second dichroic film, and the third dichroic film do not cross each other, an ineffective region that fails to deflect light beams is no longer formed. In other words, a higher light-utilization efficiency is achieved. Besides, since the first dichroic film, the second dichroic film, and the third dichroic film are no need to be parallel to each other, the reflective angles of the first light beam, the second light beam, and the third light beam are allowed to be respectively controlled. This helps to cure deviations of incident angle and incident position resulting from off-axis of the left-sided first light-emitting chip and the right-sided third light-emitting chip, so as to make the first light beam, the second light beam, and the third light beam to leave the first dichroic film in parallel. In addition, since the first light-emitting chip, the second light-emitting chip, and the third light-emitting chip are in a same chip package and arranged in a row, the first light beam, the second light beam, and the third light beam are incident to the first dichroic film in an identical direction. In contrast, in the conventional projection apparatus, the red light, green light, and blue light are incident to the X-mirror in three respective directions. Hence, according to the row arrangement of light-emitting chips of this embodiment, the components are allowed to be disposed in the projection apparatus in a space-efficient way to reduce the occupied space of the projection apparatus. Besides, when the first light-emitting chip, the second light-emitting chip, and the third light-emitting chip are arranged in a row, a smaller combination of light-spots is obtained. Accordingly, different light paths may be arbitrarily selected according to the actual color or brightness demand.

Other objectives, features and advantages of the present invention will be further understood from the further technological features disclosed by the embodiments of the present invention wherein there are shown and described preferred embodiments of this invention, simply by way of illustration of modes best suited to carry out the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
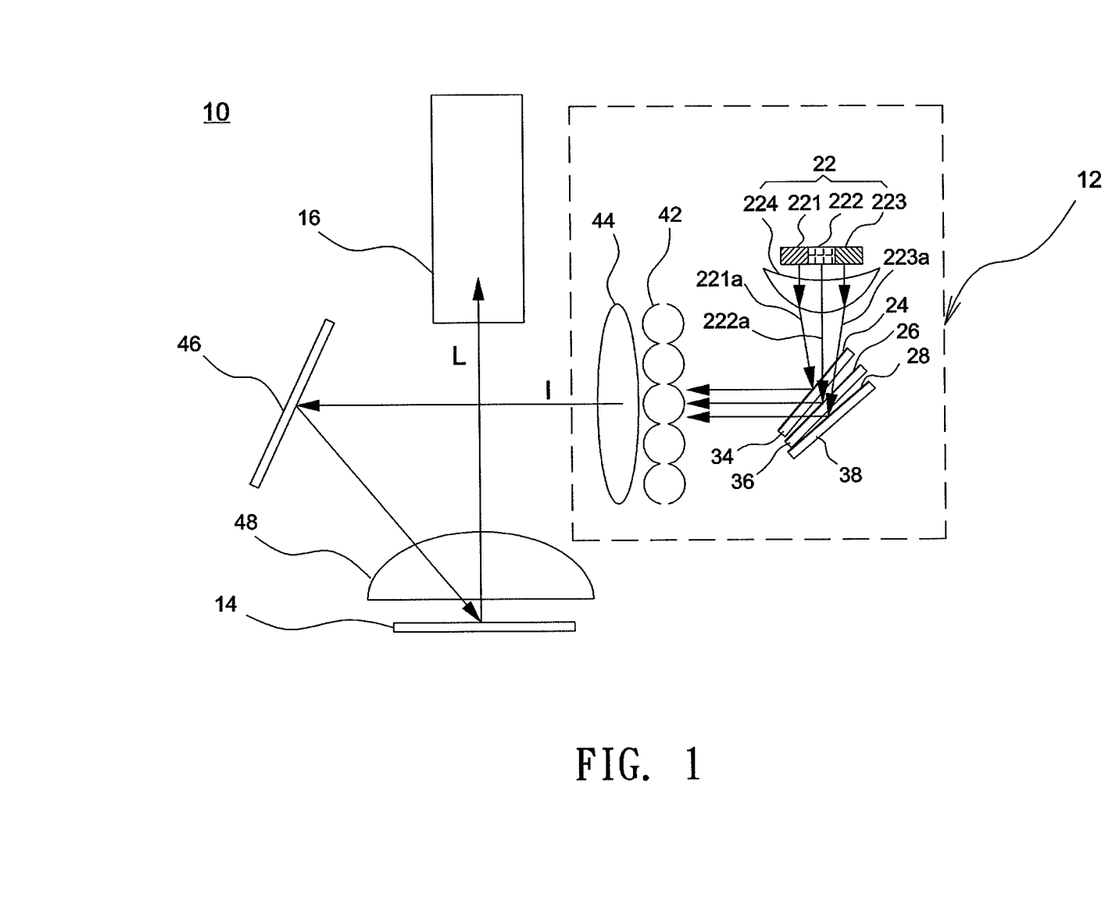
FIG. 1 shows a schematic diagram of a projection apparatus according to an embodiment of the invention.

FIG. 1 shows a schematic diagram of a projection apparatus according to an embodiment of the invention. Referring to FIG. 1, in this embodiment, the projection apparatus 10 includes an illumination system 12, a light valve 14, and a projection lens 16. The illumination system 12 includes a chip package 22, a first dichroic film 24, a second dichroic film 26, and a third dichroic film 28. The chip package 22 includes a first light-emitting chip 221, a second light-emitting chip 222, and a third light-emitting chip 223 arranged in a row. The first light-emitting chip 221 emits a first light beam 221a, the second light-emitting chip 222 emits a second light beam 222a, and the third light-emitting chip 223 emits a third light beam 223a. In this embodiment, each of the first light-emitting chip 221, the second light-emitting chip 222, and the third light-emitting chip 223 is an LED chip. Alternatively, each of the first light-emitting chip 221, the second light-emitting chip 222, and the third light-emitting chip 223 is a laser diode chip or other suitable light-emitting chip. Further, in this embodiment, the chip package 22 further includes a lens 224. The lens 224 covers the first light-emitting chip 221, the second light-emitting chip 222, and the third light-emitting chip 223, and the lens 224 is disposed in the light paths of the first light beam 221a, the second light beam 222a, and the third light beam 223a. Besides, the first light beam 221a, the second light beam 222a, and the third light beam 223a have mutually different colors. In this embodiment, the first light beam 221a may be a red light beam, the second light beam 222a may be a green light beam, and the third light beam 223a may be a blue light beam. In an alternate embodiment, the first light beam 221a, the second light beam 222a, and the third light beam 223a may have other colors different to the aforementioned colors.

In this embodiment, the first dichroic film 24, the second dichroic film 26, and the third dichroic film 28 are numbered for the proximity to the chip package 22. The first dichroic film 24 is disposed in the light paths of the first light beam 221a, the second light beam 222a, and the third light beam 223a. The second dichroic film 26 is disposed in the light paths of the second light beam 222a and the third light beam 223a. The third dichroic film 28 is disposed in the light path of the third light beam 223a. The first dichroic film 24, the second dichroic film 26, and the third dichroic film 28 are not parallel to each other and do not cross each other. The first dichroic film 24 is disposed on a surface of a first transparent substrate 34, the second dichroic film 26 is disposed on a surface of a second transparent substrate 36, and the third dichroic film 28 is disposed on a surface of a third transparent substrate 38. It is should be noted that the arrangement of the first dichroic film 24, the second dichroic film 26, and the third dichroic film 28 is not limited to the above embodiment. In an alternate embodiment, the first dichroic film 24 and the second dichroic film 26 are disposed on two opposite sides of the first transparent substrate 34 to thus omit the third transparent substrate 38. The first dichroic film 24 reflects the first light beam 221a and transmits the second light beam 222a, and the second dichroic film 26 reflects the second light beam 222a. The first dichroic film 24 and the second dichroic film 26 transmit the third light beam 223a, and the third dichroic film 28 reflects the third light beam 223a. When the first light beam 221a, the second light beam 222a, and the third light beam 223a leave the first dichroic film 24, the second dichroic film 26, and the third dichroic film 28 respectively, the first light beam 221a, the second light beam 222a, and the third light beam 223a together form an illumination light beam I.

In addition, in this embodiment, the illumination system 12 further includes a light-homogenizing element 42 and a condenser lens 44. The light-homogenizing element 42 and the condenser lens 44 are disposed in the light paths of the first light beam 221a, the second light beam 222a, and the third light beam 223a and between the first dichroic film 24 and the light valve 14. More specifically, the light-homogenizing element 42 may be a fly-eye lens for evenly spreading out the illumination light beam I on the light valve 14. Besides, in this embodiment, the first light-emitting chip 221, the second light-emitting chip 222, and the third light-emitting chip 223 take turns to emit a light beam, so that the color of the illumination light beam I leaving the second dichroic film 26 is allowed to change over time. For example, the second light-emitting chip 222 first turns on and then off one times, then the first light-emitting chip 221 turns on and then off one times, and finally the third light-emitting chip 223 turns on and then off one times. These light-emitting chips alternately turn on and off in such order to allow the illumination light beam I leaving the second dichroic film 26 to represent green, red, and blue colors in succession. In an alternate embodiment, the first light-emitting chip 221, the second light-emitting chip 222, and the third light-emitting chip 223 may emit light beams simultaneously to allow the illumination light beam I to represent a white color. The light valve 14 is disposed in the light path of the illumination light beam I for transforming the illumination light beam I into an image beam L. In this embodiment, the light valve 14 may be a digital micro-mirror device. However, in other embodiments, the light valve 14 may be a liquid-crystal-on-silicon panel, or a transmissive liquid crystal panel. A projection lens 16 is disposed in the light path of the image beam L to project the image beam L onto a screen (not shown). Moreover, in this embodiment, the projection apparatus 10 further includes a reflective mirror 46 disposed in the light path of the illumination light beam I and between the illumination system 12 and the light valve 14. The reflective mirror 46 is allowed to bend the light path of the illumination light beam Ito more efficiently use the accommodation space of the projection apparatus 10. Besides, a field lens 48 is disposed in the light path of the image beam L and between the light valve 14 and the projection lens 16.

The embodiments of the invention have at least one of the following advantages. First, since the first dichroic film 24, the second dichroic film 26, and the third dichroic film 28 of the projection apparatus 10 do not cross each other, an ineffective region that fails to deflect light beams is no longer formed. In other words, the projection apparatus 10 has relatively high light-utilization efficiency. Besides, since the first dichroic film 24, the second dichroic film 26, and the third dichroic film 28 are no need to be parallel to each other, the reflective angles of the first light beam 221*a*, the second light beam 222*a*, and the third light beam 223*a* are allowed to be respectively controlled. This helps to cure deviations of incident angle and incident position resulting from off-axis of the left-sided first light-emitting chip 221 and the right-sided third light-emitting chip 223, so as to allow the first light beam 221*a*, the second light beam 222*a*, and the third light beam 223*a* to leave the first dichroic film 24 in parallel. In addition, since the first light-emitting chip 221, the second light-emitting chip 222, and the third light-emitting chip 223 are in a same chip package 22 and arranged in a row, the first light beam 221*a*, the second light beam 222*a*, and the third light beam 223*a* are incident to the first dichroic film 24 in an identical direction. In contrast, in the conventional projection apparatus, the red light, green light, and blue light are incident to the X-mirror in three respective directions. Hence, according to the row arrangement of light-emitting chips of this embodiment, the components are allowed to be disposed in the projection apparatus 10 in a space-efficient way to reduce the occupied space of the projection apparatus 10. Besides, when the first light-emitting chip 221, the second light-emitting chip 222, and the third light-emitting chip 223 are arranged in a row, a smaller combination of light-spots is obtained.

Figure 2A:
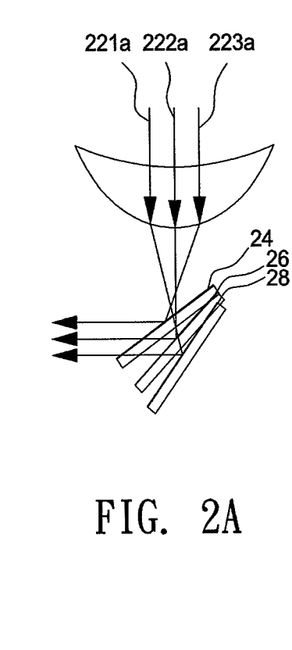
FIGS. 2A to 2C show different embodiments of light paths for a projection apparatus, where three light-emitting chips are arranged in a row.
Figure 2B:
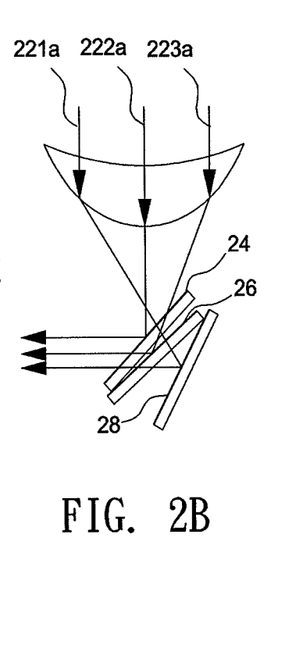
Figure 2C:
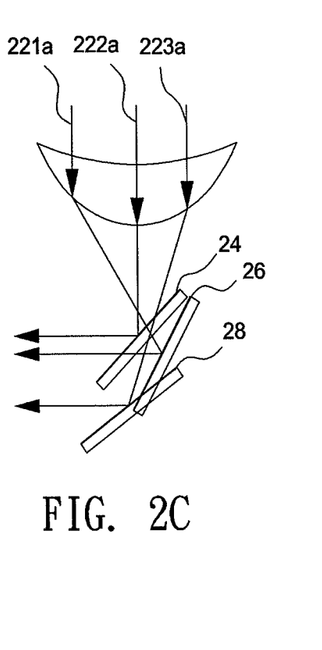

FIGS. 2A to 2C show different embodiments of light paths for a projection apparatus, where three light-emitting chips are arranged in a row. Referring to FIGS. 2A to 2C, each dichroic film is not limited to reflect a specific color of light. For example, as shown in FIG. 2A, the first light beam 221*a*, the second light beam 222*a*, and the third light beam 223*a* are respectively reflected by the third dichroic film 28, the second dichroic film 26, and the first dichroic film 24. Particularly, according to the arrangement shown in FIG. 2A where green LED chip is placed in the middle of the red LED chip and blue LED chip, better spectral performance of light that passes through or is reflected by a dichroic film is obtained. Further, according to the arrangement shown in FIGS. 2B and 2C where a green light beam is incident to the first dichroic film 24, the light loss as a result of passing through a dichroic film is reduced to provide a higher amount of green light and thus to enhance the overall brightness. Also, in that case, since the green light beam is reflected by the first dichroic film 24 in advance, better spectral performance of red light and blue light that pass the dichroic films is obtained to improve the transmission of the red light and the blue light. Accordingly, different light paths may be arbitrarily selected according to the actual color or brightness demand.

Figure 3:
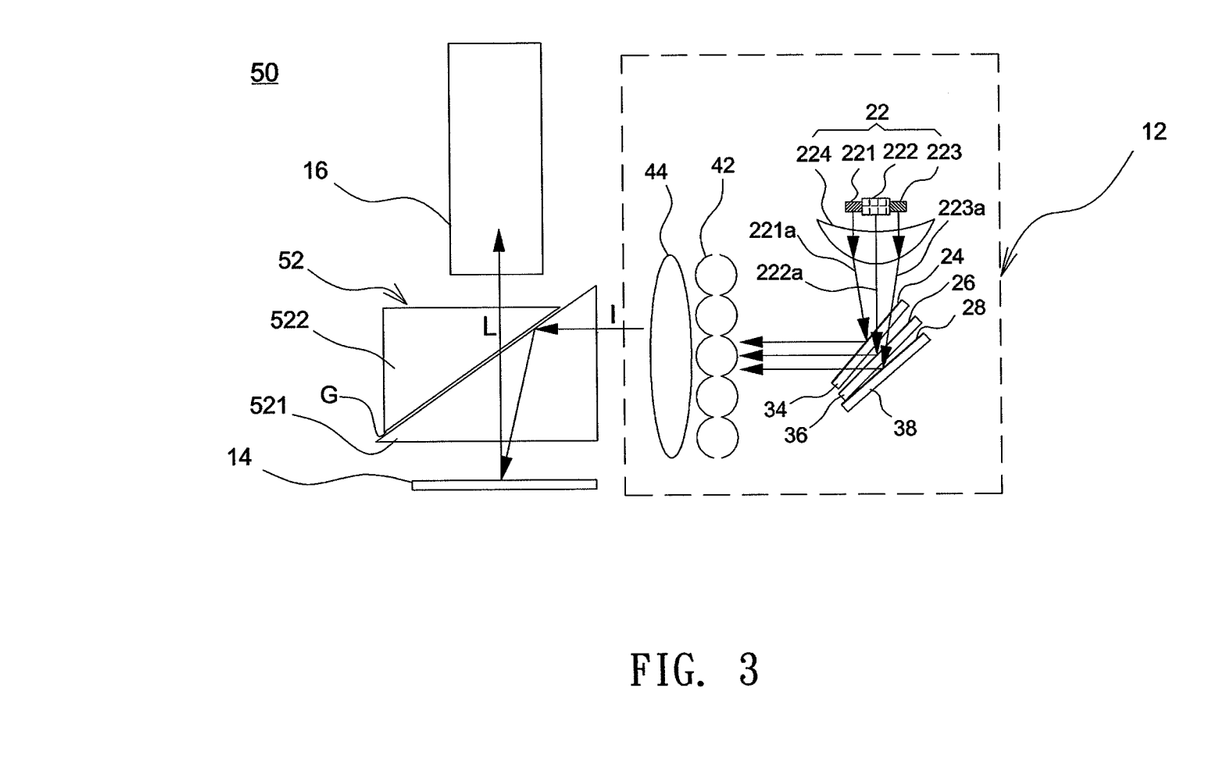
FIG. 3 shows a schematic diagram of a projection apparatus according to another embodiment of the invention.

FIG. 3 shows a schematic diagram of a projection apparatus according to another embodiment of the invention. Referring to FIG. 3, the projection apparatus 50 includes a total-internal-reflection prism 52 disposed in the light paths of the illumination light beam I and the image beam L and between the light valve 14 and the projection lens 16. More specifically, the total-internal-reflection prism 52 includes a first prism 521 and a second prism 522, and a gap G exists between the first prism 521 and the second prism 522 to form a total reflection surface on the first prism 521. The illumination light beam I from the light-homogenizing element 42 enters the first prism 521 through an incident face of the first prism 521, and then reflected by the total reflection surface to the light valve 14. Further, the image beam L from the light valve 14 passes through the first prism 521, the gap G, and the second prism 522 in succession and then enters the projection lens 16. In addition, as shown in FIG. 3, the second light-emitting chip 222 is disposed between the first light-emitting chip 221 and the third light-emitting chip 223, and the size of the first light-emitting chip 221 and the size of the third light-emitting chip 223 are both smaller than the size of the second light-emitting chip 222. As a result, the filed points formed by the first light-emitting chip 221 and the third light-emitting chip 223 are reduced, and the optical efficiency of the first light-emitting chip 221 and the third light-emitting chip 223 is improved.

Figure 4:
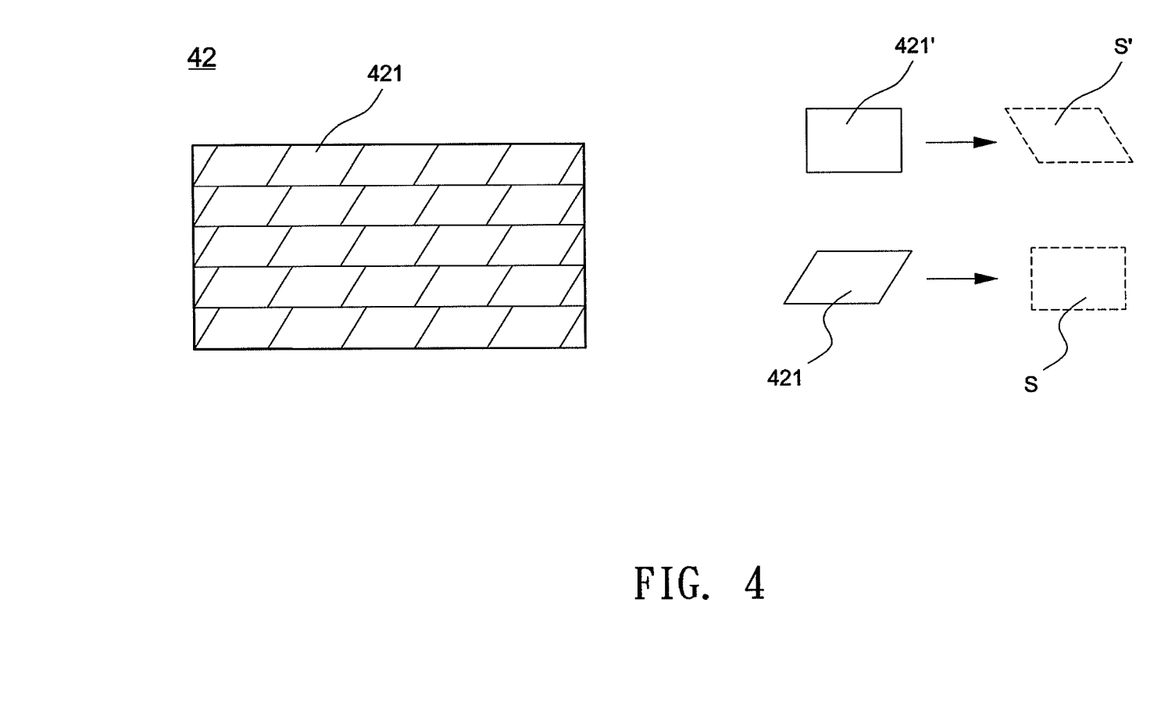
FIG. 4 shows a schematic diagram of a light-homogenizing element according to an embodiment of the invention.

Referring to FIG. 4, in one embodiment, the light-homogenizing element 42 is a fly-eye lens. The fly-eye lens includes a plurality of lens element 421 arranged in an array. Typically, a light path in which a light beam propagates in the projection apparatus is bent to thus deform the light spots formed on the light valve 14. For example, as shown in FIG. 4, a rectangular-shaped lens element 421' forms a slanted light spot S' in the shape of a slanted parallelogram on the light valve 14, since the light beam leaving the lens element 421' is obliquely incident to the light valve 14. Therefore, the desired lens element 421 is inversely shaped to slant toward a direction reverse to the slant direction of the slanted light spot S'. That is, each of the lens elements 421 has a shape complementary to the shape of a corresponding light spot deformed as a result of oblique incidence. Under the circumstance, each lens element 421 in turn forms a rectangular-shaped light-spot S on the light valve 14 to improve light-utilization efficiency and luminous uniformity.

Figure 5A:
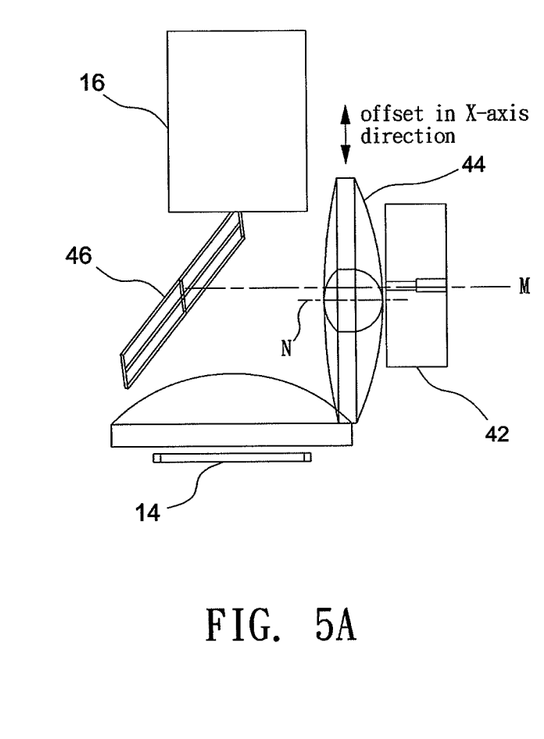
FIGS. 5A and 5B show schematic diagrams of an eccentric projection apparatus according to an embodiment of the invention.
Figure 5B:
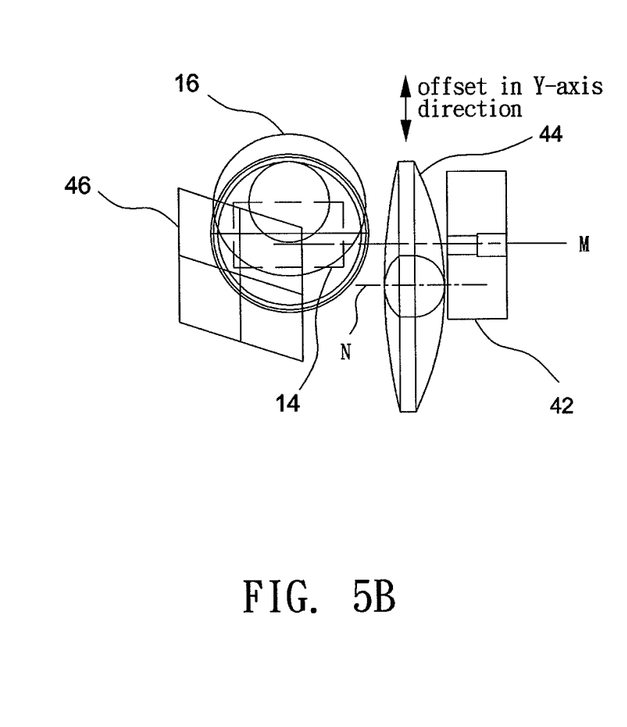

In one embodiment, the condenser lens 44 is disposed in the light path of the illumination light beam I and between the light-homogenizing element 42 and the light valve 14. A central axis N of the condenser lens 44 is away from an optical axis M of the projection apparatus 10. For example, as shown in FIG. 5A, the central axis N of the condenser lens 44 is shifted some distance in an X-axis direction in relation to the optical axis M of the projection apparatus 10. Alternatively, as shown in FIG. 5B, the central axis N is shifted some distance in a Y-axis direction in relation to the optical axis M. Through the eccentric design of the condenser lens 44, a light path length within a confined space is increased and the shape of light spots is allowed to be adjusted. This may shrink the overall size of the projection apparatus and reduce the loss of light.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
   a chip package, comprising:
      a first light-emitting chip capable of emitting a first light beam;
      a second light-emitting chip capable of emitting a second light beam; and
      a third light-emitting chip capable of emitting a third light beam, wherein the first light-emitting chip, the second light-emitting chip, and the third light-emitting chip are arranged in a row, and the first light beam, the second light beam, and the third light beam have mutually different colors;
   a first dichroic film disposed in the light paths of the first light beam, the second light beam, and the third light beam;
   a second dichroic film disposed in the light paths of the second light beam and the third light beam; and
   a third dichroic film disposed in the light path of the third light beam,
   wherein the first dichroic film, the second dichroic film, and the third dichroic film are numbered for the proximity to the chip package, are not parallel to each other, and do not cross each other, and the first dichroic film is capable of reflecting the first light beam and transmitting the second light beam, the second dichroic film is capable of reflecting the second light beam, the first dichroic film and the second dichroic film are capable of transmitting the third light beam, the third dichroic film is capable of reflecting the third light beam, and the first light beam, the second light beam, and the third light beam form an illumination light beam as the first light beam, the second light beam, and the third light beam respectively leaving the first dichroic film, the second dichroic film, and the third dichroic film, and
   wherein the light paths of the first, the second, and the third light beams respectively are parallel to each other as the first, the second, and the third light beams are in the process of leaving the first, the second, and the third dichroic films.

2. The illumination system as claimed in claim 1, further comprising a light-homogenizing element disposed in the light path of the illumination light beam.

3. The illumination system as claimed in claim 1, wherein the chip package comprises a lens, and the lens covers the first light-emitting chip, the second light-emitting chip, and the third light-emitting chip.

4. The illumination system as claimed in claim 1, further comprising:
   a first transparent substrate having a first surface, wherein the first dichroic film is disposed on the first surface;
   a second transparent substrate having a second surface, wherein the second dichroic film is disposed on the second surface; and
   a third transparent substrate having a third surface, wherein the third dichroic film is disposed on the third surface.

5. The illumination system as claimed in claim 1, wherein the second light-emitting chip is disposed between the first light-emitting chip and the third light-emitting chip, and the sizes of the first light-emitting chip and the third light-emitting chip are both smaller than the size of the second light-emitting chip.

6. The illumination system as claimed in claim 1, wherein the first light beam or the second light beam is a green light beam.

7. A projection apparatus, comprising:
   an illumination system, comprising:
      a chip package, comprising:
         a first light-emitting chip capable of emitting a first light beam;
         a second light-emitting chip capable of emitting a second light beam; and
         a third light-emitting chip capable of emitting a third light beam, wherein the first light-emitting chip, the second light-emitting chip, and the third light-emitting chip are arranged in a row, and the first light beam, the second light beam, and the third light beam have mutually different colors;
      a first dichroic film disposed in the light paths of the first light beam, the second light beam, and the third light beam;
      a second dichroic film disposed in the light paths of the second light beam and the third light beam; and
      a third dichroic film disposed in the light path of the third light beam, wherein the first dichroic film, the second dichroic film, and the third dichroic film are numbered for the proximity to the chip package, are not parallel to each other, and do not cross each other, and the first dichroic film is capable of reflecting the first light beam and transmitting the second light beam, the second dichroic film is capable of reflecting the second light beam, the first dichroic film and the second dichroic film are capable of transmitting the third light beam, the third dichroic film is capable of reflecting the third light beam, and the first light beam, the second light beam, and the third light beam form an illumination light beam as the first light beam, the second light beam, and the third light beam respectively leaving the first dichroic film, the second dichroic film, and the third dichroic film, and wherein the light paths of the first, the second, and the third light beams respectively are parallel to each other as the first, the second, and the third light beams are in the process of leaving the first, the second, and the third dichroic films;

a light valve disposed in the light path of the illumination light beam for transforming the illumination light beam into an image beam;

a projection lens disposed in the light path of the image beam;

a light-homogenizing element disposed in the light path of the illumination light beam and between the first dichroic film and the light valve; and a condenser lens disposed in the light path of the illumination light beam and between the light-homogenizing element and the light valve, wherein a central axis of the condenser lens is away from an optical axis of the projection apparatus.

8. The projection apparatus as claimed in claim 7, further comprising a total-internal-reflection prism disposed in the light paths of the illumination light beam and the image beam and between the light valve and the projection lens.

9. The projection apparatus as claimed in claim 7, further comprising a reflective mirror disposed in the light path of the illumination light beam and between the illumination system and the light valve.

10. The projection apparatus as claimed in claim 7, wherein the light-homogenizing element is a fly-eye lens.

11. The projection apparatus as claimed in claim 10, wherein the fly-eye lens has a plurality of lens elements arranged in an array, and each of the lens elements has a shape complementary to the shape of a light spot deformed as a result of oblique incidence.

12. A projection apparatus, comprising:
an illumination system, comprising:
　a chip package, comprising:
　　a first light-emitting chip capable of emitting a first light beam;
　　a second light-emitting chip capable of emitting a second light beam; and
　　a third light-emitting chip capable of emitting a third light beam, wherein the first light-emitting chip, the second light-emitting chip, and the third light-emitting chip are arranged in a row, the second. light-emitting chip is disposed between the first light-emitting chip and the third light-emitting chip, the sizes of the first light-emitting chip and the third light-emitting chip are both smaller than the size of the second light-emitting chip, and the first light beam, the second light beam, and the third light beam have mutually different colors;

a first dichroic film for deflecting the first light beam;
　　a second. dichroic film for deflecting the second light beam; and
　　a third dichroic film for deflecting the third light beam, wherein the first dichroic film, the second dichroic film, and the third dichroic film are not parallel to each other and do not cross each other, and the first light beam, the second light beam, and the third light beam form an illumination light beam as the first light beam, the second light beam, and the third light beam respectively leaving the first dichroic film, the second dichroic film, and the third dichroic and wherein the light paths of the first, the second, and the third light beams respectively are parallel to each other as the first the second, and the third light beams are in the process of leaving the first, the second, and the third dichroic films;

a light valve disposed in the light path of the illumination light beam for transforming the illumination light beam into an image beam;

a light-homogenizing element disposed in the light path of the illumination light beam and between the first dichroic film, the second dichroic film, the third dichroic film, and the light valve;

a condenser lens disposed in the light path of the illumination light beam and between the light-homogenizing element and the light valve, wherein a central axis of the condenser lens is away from an optical axis of the projection apparatus; and a projection lens disposed in the light path of the image beam.

13. The projection apparatus as claimed in claim 12, further comprising a total-internal-reflection prism disposed in the light paths of the illumination light beam and the image beam and between the light valve and the projection lens.

14. The projection apparatus as claimed in claim 12, further comprising a reflective mirror disposed in the light path of the illumination light beam and between the illumination system and the light valve.

15. The projection apparatus as claimed in claim 12, wherein the light-homogenizing element is a fly-eye lens, the fly-eye lens has a plurality of lens elements arranged in an array, and each of the lens elements has a shape complementary to the shape of a light spot deformed as a result of oblique incidence.

* * * * *